United States Patent [19]

Kanemitsu

[11] Patent Number: 4,831,705
[45] Date of Patent: May 23, 1989

[54] METHOD OF MANUFACTURING A SHEET METAL POLY-V PULLEY

[75] Inventor: Masahiro Kanemitsu, Kobe, Japan

[73] Assignee: Kabushiki Kaisha Kanemitsu, Japan

[21] Appl. No.: 169,956

[22] Filed: Mar. 18, 1988

Related U.S. Application Data

[62] Division of Ser. No. 63,236, Jun. 17, 1987, Pat. No. 4,799,909.

[51] Int. Cl.$^4$ ............................................... B21K 1/42
[52] U.S. Cl. ..................................... 29/159 R; 72/82; 72/68
[58] Field of Search ............. 29/159 R; 474/168–170, 474/174; 72/68, 82–84

[56] References Cited

U.S. PATENT DOCUMENTS

| | | | |
|---|---|---|---|
| 2,493,053 | 1/1950 | Zatyko | 29/159 R |
| 4,524,595 | 6/1985 | Oda | 29/159 R |
| 4,633,557 | 1/1987 | Kanemitsu | 29/159 R |

FOREIGN PATENT DOCUMENTS

122136  7/1983  Japan .................................. 29/159 R

Primary Examiner—P. W. Echols
Attorney, Agent, or Firm—Steele, Gould & Fried

[57] ABSTRACT

A method of manufacturing a sheet metal poly-V pulley including forming a tubular peripheral wall integrally from the peripheral edge of bottom wall and forming poly-V grooves in the peripheral wall at specified pitches, in which a bent part is formed in the bottom wall in an annular form concentric with the axial center of the peripheral wall and bulging out in a convex form toward the opening side of the peripheral wall. The load from the poly-V belt which may cause plastic deformation of the sheet metal poly-V pulley is absorbed by this bent part, so that the increase of material cost, difficulty in forming, and increase of weight due to increase of the thickness of the blank of sheet metal poly-V pulley in order to enhance the strength may be avoided.

3 Claims, 7 Drawing Sheets

METHOD OF MANUFACTURING A SHEET METAL POLY-V PULLEY

CROSS REFERENCE TO RELATED APPLICATION

This is a division of application Ser. No. 063,236, filed June 17, 1987, now U.S. Pat. No. 4,799,909.

BACKGROUND OF THE INVENTION

1. Field of the Invention

This invention relates to a sheet metal poly-V pulley having poly-V grooves formed at specified pitches in the peripheral wall of a cup-shaped blank, and a manufacturing method thereof.

2. Prior Art

Conventionally, sheet metal poly-V pulleys of this type, that is, poly-V pulleys made of sheet metal and having a plurality of V-grooves, or so-called poly-V grooves, formed at specified pitches on the peripheral wall of a cup-shaped blank possessing a bottom wall and a peripheral wall formed by deep drawing of sheet metal blank, have been sold and used widely as intermediate conduction poly-V pulleys in, for example, vehicle engines.

Incidentally, this kind of sheet metal poly-V pulley, unlike the cast product, is very lightweight because thin sheet metal blank is drawn, rolled and processed. The transmission of rotation to the belt, which is wound around the pulley is very high, so that the belt is efficiently driven at high speed. Aside from such advantages, the strength of the poly-V belt, to be wound around the sheet metal poly-V pulley, is extremely improved and, due to such enhancement, the poly-V belt is not subject to breakage if the sheet metal poly-V pulley is rotated at a considerably high speed. That is, in order to rotate the poly-V belt at high speed, the belt must be wound around and engaged with the sheet metal poly-V pulley at a very high tension, and if rotated by winding and engaging at such high tension, the poly-V belt is not subject to breakage.

However, as stated above, when rotated under high tension and in engagement by winding, since the poly-V pulley is made of a think sheet metal blank, plastic deformation of the pulley is likely to occur in the peripheral wall and bottom wall, or at points crossing parts of the bottom wall and peripheral wall. Hence, it is sometimes difficult to cope with the increasing strength of poly-V belts.

In this case, to prevent deformation of the sheet metal poly-V pulley, it may be possible to use a considerably thicker sheet metal blank, but this results in an increase in the cost of materials and difficulties in the manufacture of the sheet metal poly-V pulley from a thicker sheet metal blank. Also, increases in the weight of the pulley may sacrifice the advantages of the sheet metal poly-V pulley.

OBJECTS AND SUMMARY OF THE INVENTION

This invention is devised in the light of such circumstances and, hence, it is a primary object of this invention to provide a sheet metal poly-V pulley capable of effectively preventing plastic deformation due to the pushing pressure from the poly-V belt without increasing the cost of materials, the trouble of forming the pulley and increasing the weight of the pulley.

In order to achieve the above object, the sheet metal poly-V pulley of this invention has a bent part projecting in a convex form toward the opening side of peripheral wall formed, in an annular form concentric with the axial center of the peripheral wall, in the bottom wall of a cup-shaped blank.

As such, if a large pushing pressure should be applied during an arbitrary period from the poly-V belt engaged with the poly-V grooves of the rotating peripheral wall, this bent part works as a shock absorber to effectively absorb this pushing pressure by following it up. Hence, the plastic deformation in the peripheral part and bottom wall, or crossing parts of peripheral wall and bottom wall, is effectively prevented. Further, since it is enough to form a bent part projecting in a convex form toward the opening side of the peripheral wall in an annular form concentric with the peripheral wall, in the bottom wall, the structure is simple and the manufacture is easy, while the increases in weight and cost are effectively prevented. The effects of such construction are absolute and outstanding.

It is another object of this invention to provide a method of mass-producing sheet metal poly-V pulleys having said bent part in the bottom wall.

The foregoing object is achieved by providing a method comprising at least the steps of:

forming a cup-shaped blank by deep-drawing a sheet metal blank to form a cup-shaped blank made of bottom part and rough peripheral wall part;

forming a stepped part by forming an inclined stepped part in said rough peripheral wall part and dividing the rough peripheral wall part into a poly-V groove forming part at the opening edge side and a preliminary forming part at the bottom side;

forming a rough preliminary forming blank by reversely drawing said preliminarily formed part and substrate part back inward, forming an inner peripheral side, fold-back projected part which projects outward between said inclined stepped part and said preliminarily formed part, and forming a bearing part from the preliminarily formed part and an inverted substrate part from the bottom part;

forming a bent part by further reversely drawing inward said bearing part and inverted substrate part to form again, and forming an outer peripheral side, foldback projected part which projects outward between said poly-V groove formed part and inclined stepped part, and moderately curving inward in a concave form the inclined stepped part between the inner and outer peripheral side fold-back projected parts; and forming poly-V grooves having proper poly-V grooves formed in said poly-V groove forming part.

Other objects and features of this invention will become apparent in the course of the following description.

BRIEF DESCRIPTION OF THE DRAWINGS

FIGS. 3A to 3N are partially cut-away, sectional views showing further practical manufacturing steps for the manufacture of a sheet metal poly-V pulley according to this invention.

DETAILED DESCRIPTION OF THE PREFERRED EMBODIMENTS

Figure 1:
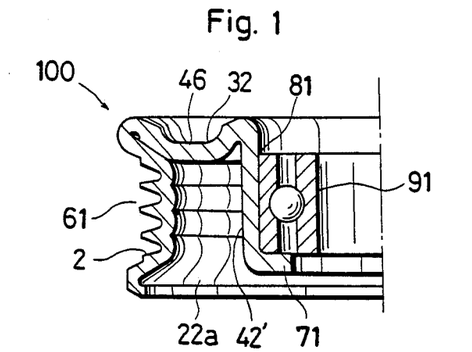
FIG. 1 is a partially cut-away, sectional view of a sheet metal poly-V pulley according to this invention.

Referring now to FIG. 1, one of the embodiments of this invention is described below, in which numeral 100 is a sheet metal poly-V pulley possessing a bearing 91. A tubular peripheral wall 2 is integrally formed from the peripheral edge of a bottom wall 32, and poly-V grooves 61 are formed in said peripheral wall 2. In the axial central part of the bottom wall 32, a bearing fitting part 81 integrally possesses a cylindrical part 42' projecting to the opening 22a side of the peripheral wall 2. An annular flange 71 projects inward from its end edge part. A bearing 91 is press-fitted into said bearing fitting part 81, and the part of said cylindrical part 42' is crimped to the axial central side so that said bearing 91 is planted in the bearing fitting part 81. Besides, in said bottom wall 32, a bent part 46 with a concave section projects in a convex form toward the opening 22a side of the peripheral wall 2 in an annular form concentric with the peripheral wall 2. This bent part 46 is used as a kind of shock absorber against the pushing pressure from the poly-V belt (not shown) which is engaged with the poly-V grooves 61 of the peripheral wall 2.

An example of the method of manufacturing the sheet metal poly-V pulley 100 possessing this bearing 91 is explained below with reference to FIGS. 2 and 3.

FIGS. 2A to 2J are partially cut-away sectional views showing the principal manufacturing steps from the sheet metal blank to the product.

Figure 2A:
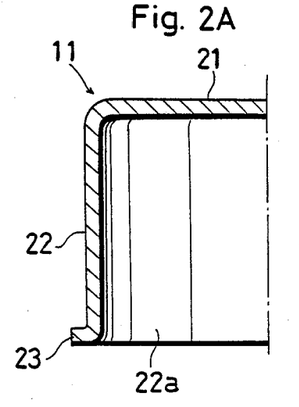
FIGS. 2A to 2J are partially cut-away, sectional views showing principal manufacturing steps from the sheet metal blank to the product.

In FIG. 2A, in the first place, a sheet metal blank of a specified thickness is deep-drawn, and a cup-shaped blank 11 is formed consisting of a bottom part 21 and a rough peripheral wall part 22 having a flange 23 at the opening 22a side.

Figure 2B:
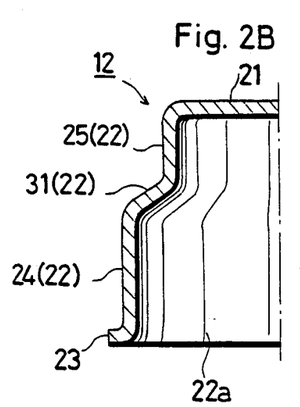

In FIG. 2B, an inclined stepped part 31 is formed on the rough peripheral wall part 22 of said cup-shaped blank 11. This rough peripheral wall part 22 is divided into a poly-V groove forming part 24 at the opening 22a side and a preliminary forming part 25 at the bottom 21 side to obtain a stepped cup-shaped blank 12.

Figure 2C:
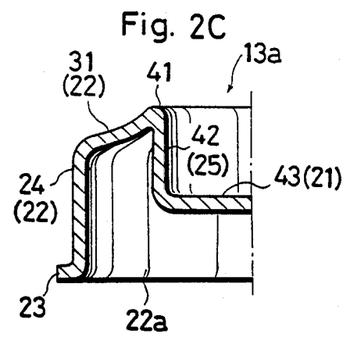

In FIG. 2C, the preliminary forming part 25 and bottom 21 side of said stepped cup-shaped blank 12 are reversely drawn and formed, and once folded back inward, an inner peripheral side fold-back projected part 41 projecting outward is formed between said inclined stepped part 31 and preliminary forming part 25. A rough preliminary forming blank 13 is obtained, using the preliminary forming part 25 as bearing support part 42 and the bottom part 21 as inverted substrate part 43.

Figure 2D:
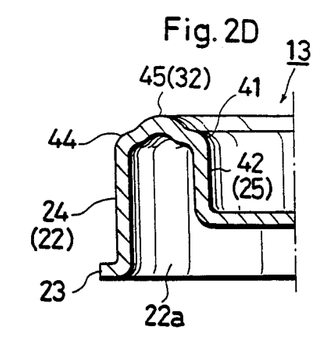

In FIG. 2D, the bearing supporting part 42 and inverted substrate part 43 of said rough preliminary forming 13 are further drawn reversely inward to form again an outer peripheral side fold-back projected part 44, similarly projecting outward, between said V-groove forming part 24 and inclined stepped part 31. The bottom wall part 32 between said bearing supporting part 42 and poly-V groove forming part 24 is drawn and a convex projected part 45 is formed projecting in an outward curvature.

Figure 2E:
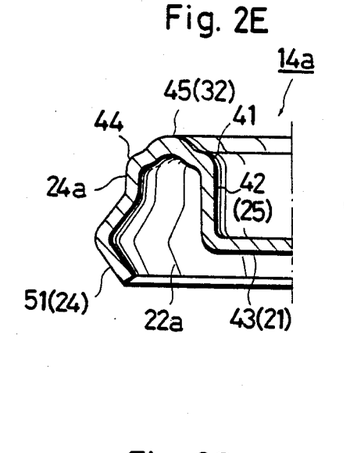

In FIG. 2E, the flange 23 of the preliminary forming blank 13, obtained in the above preliminary forming step, is cut off in a circle and removed. At the poly-V groove forming part 24, with the end part 24a left over at said outer peripheral side foldback projected part 44 side, a rough increased wall thickness forming blank 14a is obtained. An increased wall thickness projected part 51 is formed by said poly-V groove forming part 24a deflected outward by the portion corresponding to the increase of wall thickness.

Figure 2F:
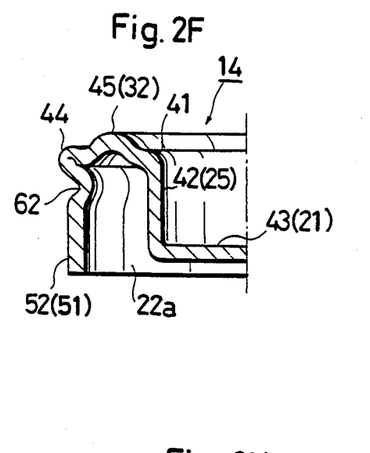
Figure 2G:
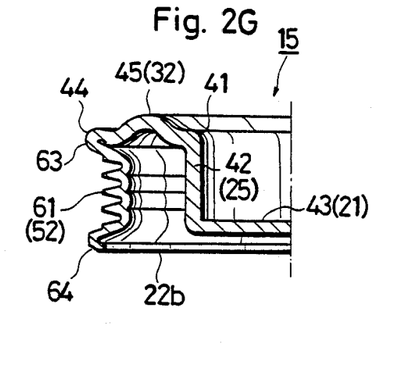

In FIG. 2F, the increased wall thickness projected part 51 of said rough increased wall thickness forming blank 14a is flattened by pressure, and a poly-V groove forming part 52 is formed with an increase in wall thickness corresponding to the degree of deflection. At the same time, a reference groove part 62 for forming poly-V grooves is formed closer to said end part 24a, and an increased wall thickness forming blank 14 is obtained.

In FIG. 2A, with the molding reference point taken at reference groove part 62, the poly-V groove forming part 52 of forming blank 14 is changed into a poly-V grooved blank 15 having a plurality of poly-V grooves 61 placed parallel to each other. Rising lugs 63, 64 are formed at both sides of said outer peripheral side foldback projected part 44 and opening edge part 22b.

Figure 2H:
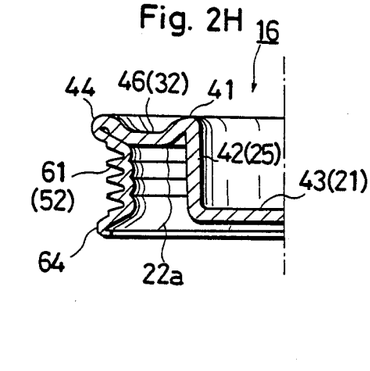

In FIG. 2H, said convex projected part 45 is drawn reversely inward. A bent part 46 is formed in the bottom wall 43 by moderately curved and bulged in a concave form into the opening 22a side of the poly-V groove forming part 52. Hence, a bent part forming blank 16 is obtained.

Figure 2I:
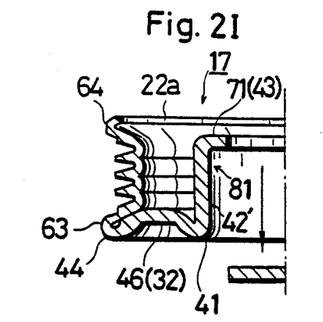

In FIG. 2I, the central part side of said inverted substrate 43 is cut off and removed. A bearing fitting part 81 composed of cylindrical part 42' and annular flange 71 is formed. A bearing forming blank 17 is therefore obtained.

Figure 2J:
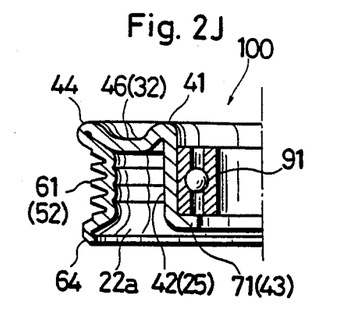

In FIG. 2J, a prefabricated bearing 91 is press fitted into the cylindrical part 42' which makes up the bearing fitting part 81 of said bearing forming blank 17. The bearing is press fit into blank 17 until abutting against flange 71. The blank is further crimped and fixed in place.

After these steps, a desired sheet metal poly-V pulley 100 is manufactured, which possesses poly-V grooves 61 in the peripheral wall, possesses a bent part 46 bulging out in a convex form toward the opening 22a side on the bottom wall 32, and has the bearing 91 planted on the axial center.

Figure 3A:
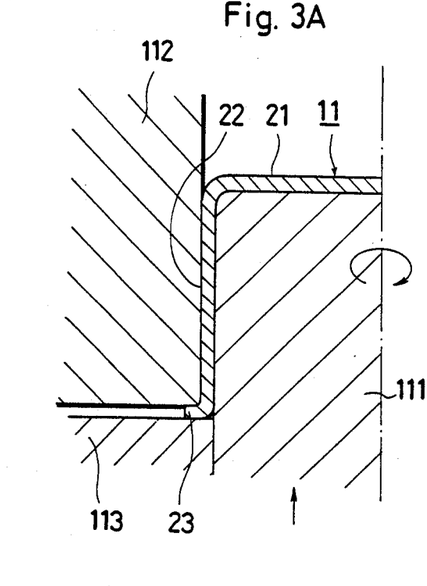
Figure 3B:
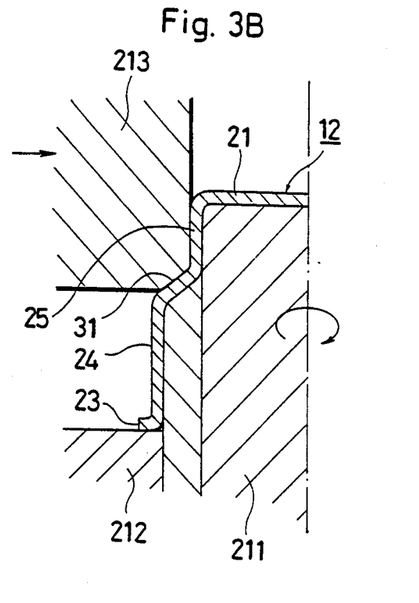
Figure 3C:
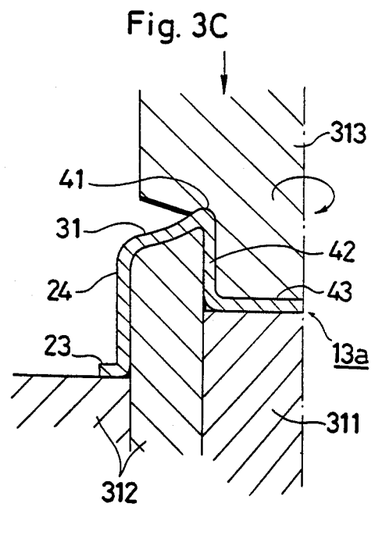
Figure 3D:
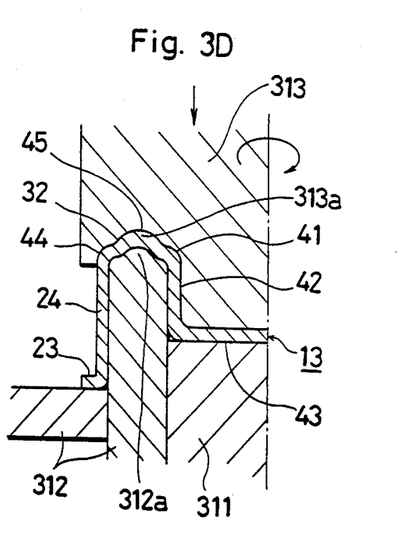
Figure 3E:
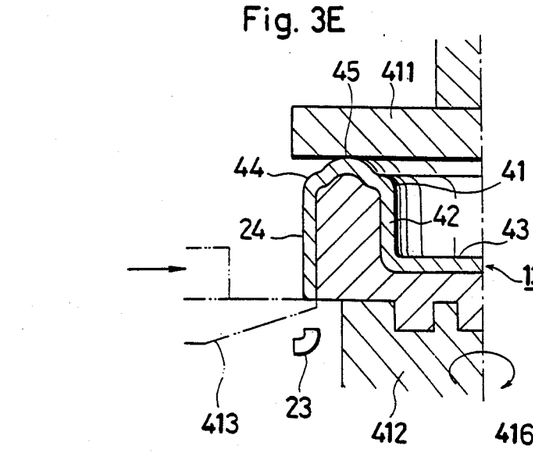
Figure 3F:
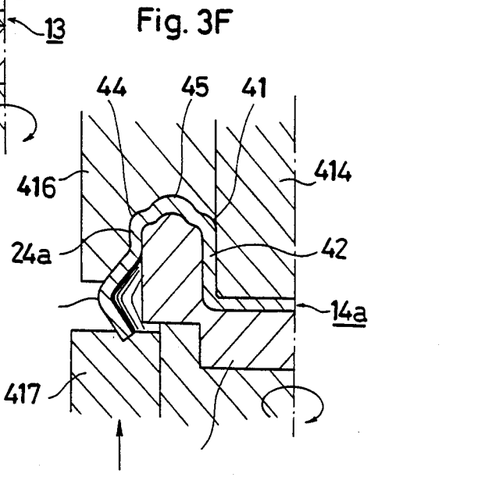
Figure 3G:
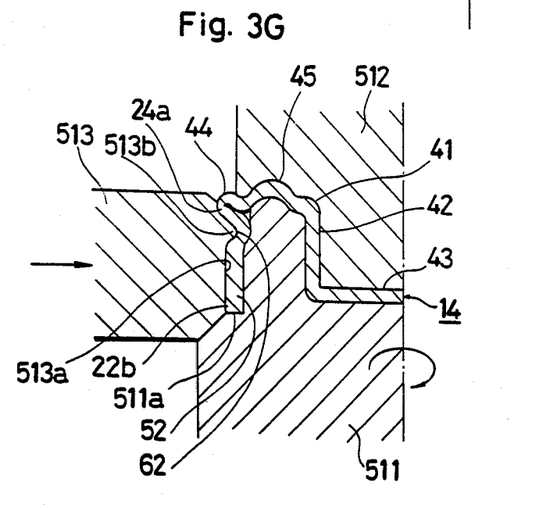
Figures 3H, 3I, 3J:
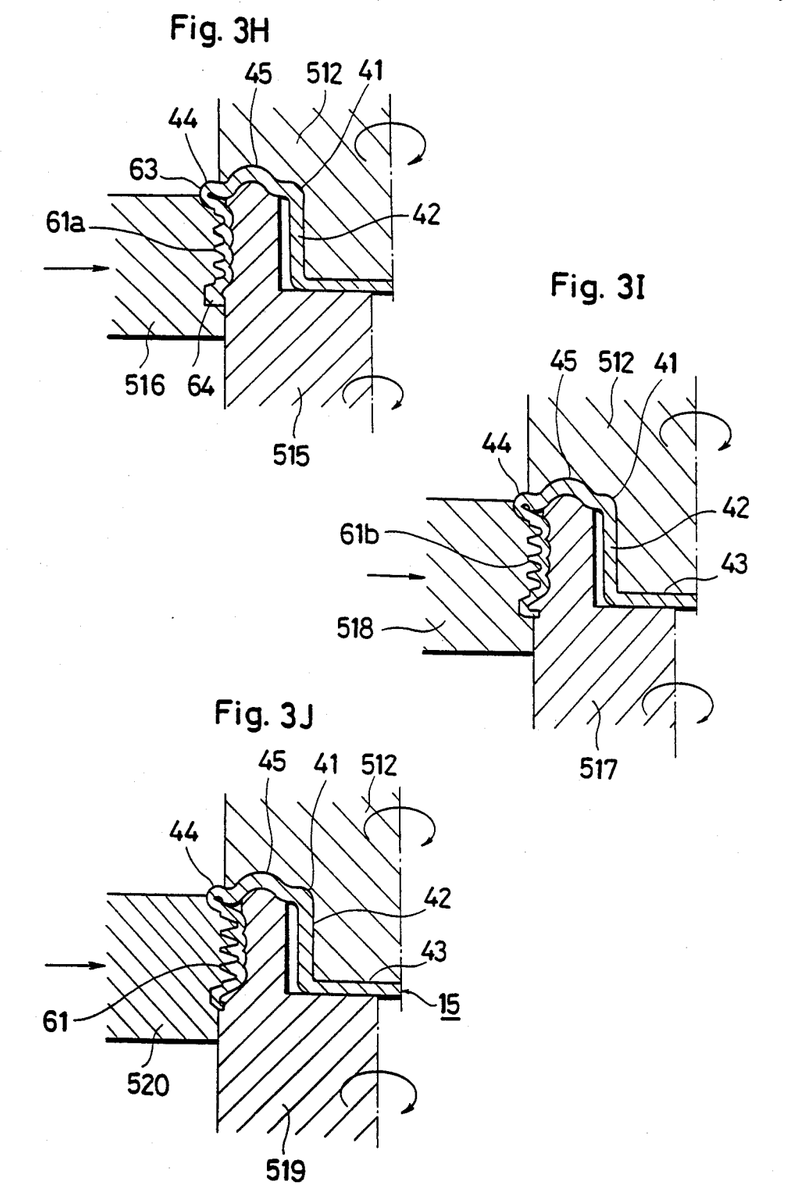
Figure 3K:
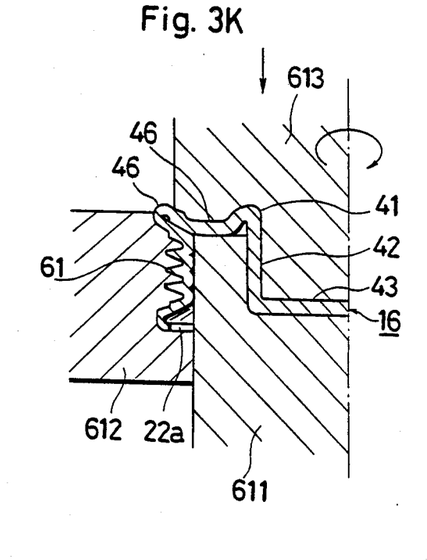
Figure 3L:
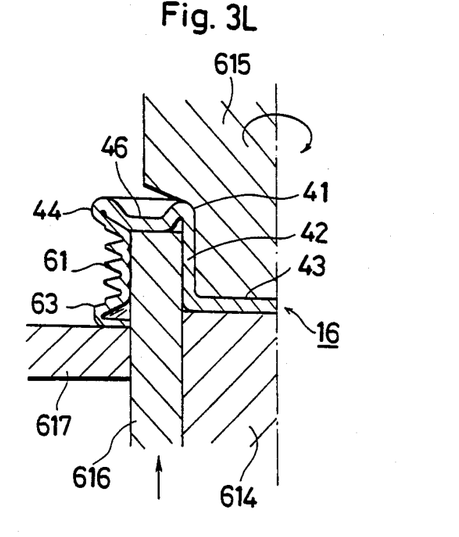
Figures 3M, 3N:
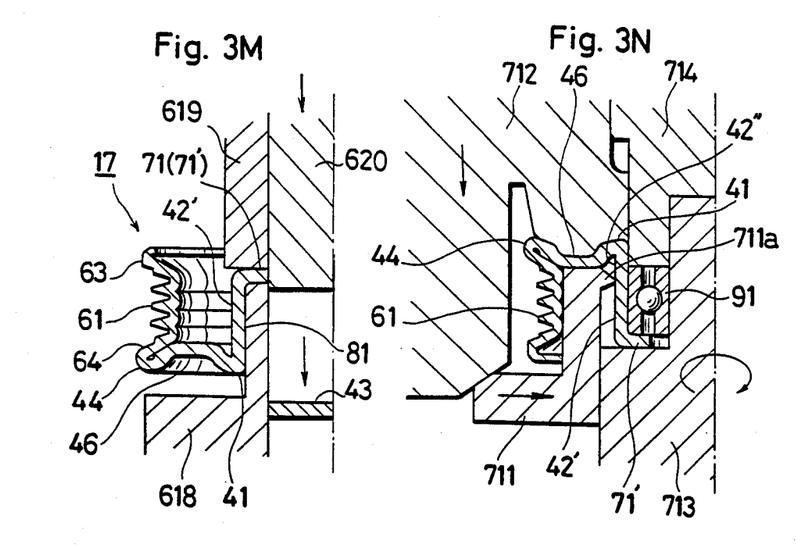

FIGS. 3A–3N are sectional explanatory drawings showing the further practical manufacturing steps of the same manufacturing method of said sheet metal poly-V pulley 100, and the details of each step are described below.

(1) Cup-shaped blank forming step (FIG. 2A):

In this cup-shaped blank forming step, as shown in FIG. 3A, a sheet metal blank of specified thickness and outside diameter is used as forming material. It is deep-drawn into specified outside diameter and drawing depth by means of movable, fixed inner and outer drawing dies 111, 112, and holding die 113. A cup-shaped blank 11 composed of bottom part 21 and rough peripheral wall part 22 is formed. At this time, at the opening edge of said rough peripheral wall part 22, a flange 23 is left over due to excess material of drawing.

(2) Stepped part forming step (FIG. 2B):

In this stepped part forming step, as shown in FIG. 3B, said cup-shaped blank 11 is fitted and held in the mutually overlaid inner holding dies 211, 212. The part of the rough peripheral wall 22 at the bottom 21 side of the cup-shaped blank 11 is preliminarily rolled by a preliminary stepped roller 213. An inclined stepped part 31 is formed in this part, and a stepped cup-shaped blank 12 is obtained.

That is, in this step, by forming the inclined stepped part 31 in the rough peripheral wall 22 of the cup-shaped blank 11, the rough peripheral wall part 22 is divided by the inclined stepped part 31 into the poly-V groove forming part 24 at the opening 22a side with increased diameter, and the preliminary forming part 25 at the bottom 21 side with decreased diameter.

(3) Rough preliminary forming blank forming step (FIG. 2C):

In this rough preliminary forming blank forming step, as shown in FIG. 3C, said stepped cup-shaped blank 12 is fitted and held in the mutually overlaid inner holding dies 311, 312. The preliminary forming part 25 and bottom part 21 of said stepped cup-shaped blank 12 are drawn reversely and formed into specified inside diameter and drawing depth by the inner drawing die 313. Parts 25 and 21 are folded back inward. An inner peripheral side fold-back projected part 41, projecting outward, is formed between said inclined stepped part 31 and preliminary forming part 25. A bearing supporting part 42 is formed from the preliminary forming part 25, and an inverted substrate part 43 from the substrate part 21.

In this step, finally, the inclined stepped part 31 and preliminary forming part 25 are formed in an acute angle in inverted state. In reverse drawing and forming in such a wide angle range, a strong internal stress occurs in the blank but, in this step, since an inner peripheral side fold-back projected part 41 is provided in this acute angle bent part, the generated internal stress is released smoothly because this part is bent at acute angle. Furthermore, it can be concentrated into this foldback projected part 41 which is composed as a kind of shock absorber so that this forming may be done easier and with higher precision.

(4) Preliminary forming blank forming step (FIG. 2D):

In this preliminary forming blank forming step, the inner drawing die 313 is pressed down and rotated against said stepped cup-shaped blank 13a which is fitted and held between the inner holding die 312, having an annular protuberance 312a formed at said inclined stepped part 31 side, as shown in FIG. 3D. An outer peripheral side fold-back projected part 44 similarly projects outward. Part 44 is formed between the poly-V groove forming part 24 and inclined stepped part 31. A preliminary forming blank 13 is obtained by forming a convex projected part 45 in the bottom wall 32 between both fold-back projected parts 41, 44.

In this step, the convex projected part 45 is formed together with the outer peripheral side folded-back projected part 41 so as to open again the inner peripheral side fold-back projected part 41. Part 41 is drawn into an acute angle in the preceding step. The internal residual stress concentrated in the inner peripheral side fold-back projected part 41 is moderately dispersed and released among the convex projected part 45 and foldback projected part 44. The fitting of the forming parts is therefore improved so that there is no risk of impeding the high precision forming.

(5) Increased wall thickness preliminary forming step (FIG. 2E):

In this increased wall thickness preliminary forming step, first as shown in FIG. 3E, said preliminary forming blank 13 is held from both inside and outside by the outer holding die 411 and inner holding die 412. The die runs along the contour of the inside of the preliminary forming blank 13, and said poly-V groove forming part 24 is cut from the preliminary forming die specified position by a shearing roller 413. The flange 23 and excess material are removed in advance to shape neatly, and then, as shown in FIG. 3F, the blank is concentrically fitted and held by the inner and outer holding dies 414, 415, 416. The end part 24a is tightly held by the inner and outer holding dies 415, 416 along the inner and outer shape of the preliminary forming blank 13. The poly-V groove forming part 24 is deflected outwardly to the outer peripheral side by the portion corresponding to the increase of wall thickness stated below. This is accomplished by means of outer drawing and forming die 417. An increased wall thickness projected part 51 is firmed, and a rough increased wall thickness forming blank 14a is obtained.

(6) Increased wall thickness forming step (FIG. 2F):

In this increased wall thickness forming step, first as shown in FIG. 3G, said rough increased wall thickness forming blank 14a is held in a preliminary forming die 511. The convex projected part 45 of said blank 14a, inner peripheral side foldback projected part 41, bearing supporting part 42, and inverted substrate part 43 are concentrically held from outside by an outer holding die 512. The increased wall thickness projected part 51 is supported by abutting its opening edge, that is, said opening edge 22b, against the abutting stepped part 511a of the preliminary forming die 511.

In this state, by means of the poly-V groove preliminary forming roller 513 which also functions as wall thickness increasing roller, the bulging end part of the increased wall thickness projected part 51 is pressed. Since the opening edge 22b of the increased wall thickness projected part 51 is supported by abutting against the stepped part 511a, this increased wall thickness part 51 is gradually rolled and flattened by pressure by the roller surface 513a. Surface 513a is part of roller 513. Part 51 is formed in plastic fluidity so that an increase to specified wall thickness is achieved in this part. At the same time, by the protruding forming plane 513b of this roller 513, the end part 24a is brought closer to the increased wall thickness projected part 51. Also the outer peripheral side fold-back projected part 44 of the poly-V groove forming part 52, which is increased in wall thickness, is drawn from the outer periphery to be rolled preliminarily. A reference groove part 62 serves as the forming standard point. Part 62 is preliminarily formed in part 52 for poly-V groove forming, so that the increased wall thickness forming blank 14 is obtained.

In this case, the internal stress due to the formation of the thicker wall of poly-V groove forming part 52, and the simultaneous roll formation of reference groove part 62 is absorbed effectively by the presence of the outer peripheral fold-back projected part 44. Hence, this stress is not applied to other forming parts.

(7) Poly-V groove forming step (FIG. 2G):

In this poly-V groove forming step, first as shown in FIGS. 3H and 3I, a combination of said preliminary forming die 511 and forming roller 513 is used. This combination is sequentially replaced by the combination of the deviated first and second poly-V groove preliminary forming dies 515, 517 and forming rollers 516, 518. While keeping the same holding state, said reference groove part 62 is used as one forming reference point for poly-V groove forming. For poly-V groove forming part 52, a plurality of preliminary poly-V grooves 61a, 61b are placed parallel, during first and second preliminary rollings, and are drawn in gradually. Rising lugs 53, 64 are similarly formed to stand up gradually at the outer peripheral side fold-back projected part 44 side and opening edge 22b side.

That is, with respect to the thicker wall poly-V groove forming part 52, the reference groove part 62 serves as the forming reference point for the poly-V groove formation. Further as stated above, due to the presence of the outer peripheral side fold-back projected part 44, the internal stress is effectively absorbed. A plurality of preliminary poly-V grooves 61a, 61b are formed as first and second preliminary rollings. The grooves are formed in parallel and in an accurate dimensional configuration. Sufficient wall thickness is thereby controlled.

Afterwards, as shown in FIG. 3J, the combination of poly-V groove forming die and forming roller is replaced by the combination of deviated poly-V groove finishing forming die 519 and poly-V groove finishing forming roller 520. Keeping the same holding state, a plurality of preliminary poly-V grooves 61b are set parallel by said second preliminary rolling and are drawn deep, finished and rolled from outer periphery by the V-groove finishing forming roller 520. The parallel, plurality of poly-V grooves 61 are formed with a high degree of precision due to the poly-V groove forming part 52. Hence, a poly-V groove blank 15 is obtained.

Here, too, in the preliminary rolling of the poly-V grooves 61 and the finish-rolling, the delicate actions causing internal stresses are effectively absorbed by the outer peripheral foldback projected part 44 and the convex projected part 45 that bulges outward from the contact with part 44. The effects of the stress of formation and any residual stress is not imparted to the other forming parts.

(8) Bent part forming step (FIG. 2H):

In this bent part forming step, said poly-V grooved blank 15 is held in the inner holding die 611 as shown in FIG. 3K. The poly-V grooves 61 of this blank 15 are held from outside by the holding die 612.

While rotating the reverse drawing roller 613, said convex projected part 45 is drawn reversely, and a bent part 46 is formed which includes convex projected part 45 bulging out to the opening 22a side. The bent part forming blank 16 is therefore obtained.

In this step, too, when forming the bent part 46, the delicate actions caused by the internal stresses are effectively absorbed by the inner peripheral side fold-back projected part 41 and outer peripheral side fold-back projected part 44. Hence, the effects of the stress of formation or the residual stress is not imparted to the other forming parts.

(9) Bearing part forming step (FIG. 2I):

In this bearing part forming step, first as shown in FIG. 3L, said bent part forming member 16 is firmly held, as described above, by the inner holding dies 614, 615 and outer holding die 616. The bearing support part 41 of the bent part forming blank 16 is once again shaped by the shaping roll 617. The dimensions and precision thereof are corrected in this manner.

In this case, too, the internal stress generated at the time of shaping may be favorably absorbed by the inner peripheral side fold-back projected part 41 and bent part 46.

Next, as shown in FIG. 3M, the peripheral part 71 of the inverted substrate 43, communicating with the bent part 46 of said bent part forming blank 16, is firmly held by other inner holding die 618 and outer holding die 619. The central side of this inverted substrate part 43 is cut off and removed, leaving only the part of the peripheral part 71. The cutting is done by means of shearing die 620, thereby forming a bearing fitting part 81 composed of cylindrical part 42 and annular flange part 71. A bearing forming member 17 is thereby obtained.

(10) Bearing press-fitting, crimping step (FIG. 2J):

In this bearing press-fitting, crimping step, first as shown in FIG. 3N, the bent part 46 of said bearing forming member 17 is similarly held firmly as described above by means of inner holding die 711 and outer holding die 712. The outer base part of the cylindrical part 42' is held by the protruding end 711a of the inner holding die 711. The annular flange part 71 is held by the inner holding die 713. In this state, using a push-in die 714, a prefabricated bearing 91 is press-fitted into the cylindrical part 42's. The bearing fitting part 81 is made when abutting against the flange part 71. The outer upper part 42" of the cylindrical part 42' is crimped to set in place.

In this bearing press-fitting and crimping step, the outer base part of the cylindrical part 42' is stopped by the protruding end 711a of the inner holding die 711. The flange part 71 is received by the inner holding die 713 to insure a smooth and easy press-fit and crimp of the prefabricated bearing 91.

In this way, as intended by this embodiment, a sheet metal poly-V pulley 100 is made having poly-V grooves 71 in the peripheral wall 2. The pulley further includes bent part 46 which is annular and bulging out in convex form into the opening 22a side of the peripheral part. The part 46 is formed in the bottom wall 32. The pulley also includes bearing 91 planted in the axial central part of the bottom wall 32. Pulley 100 is therefore manufactured with a high degree of precision.

Figure 4:
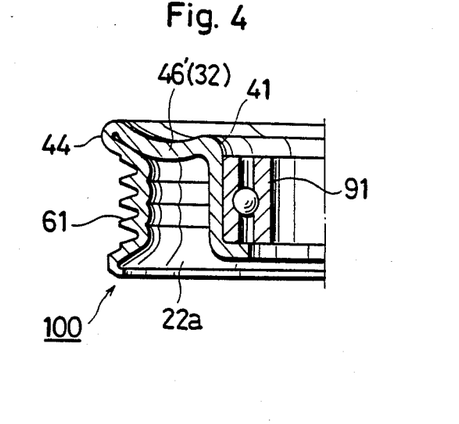
FIGS. 4 to 7 are partially cut-away, sectional views showing other embodiments of this invention.

Incidentally, the bent part is not limited to the sectional shape shown in the embodiment, but it may be, for example as shown in FIG. 4, a bent part 46' moderately bulging in a concave form to the opening 22a side.

Similarly, the formation of the bent part is not limited to this embodiment in which it is once projected outward, opposite the side of opening 22a side, and is then drawn in reversely to bulge out in a convex form at the opening 22a side. Instead, for example, it may be convexly bulged out to the opening 22a side from the beginning.

Figure 5:
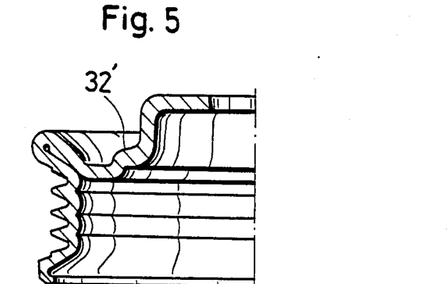

The sheet metal poly-V pulley of this invention is not limited to the sheet metal poly-V pulley having the bearing as shown in this embodiment. This invention may be similarly applied to a sheet metal poly-V pulley without a bearing or a sheet metal poly-V pulley having a stepped bottom wall 32' as shown in FIG. 5.

Figure 6:
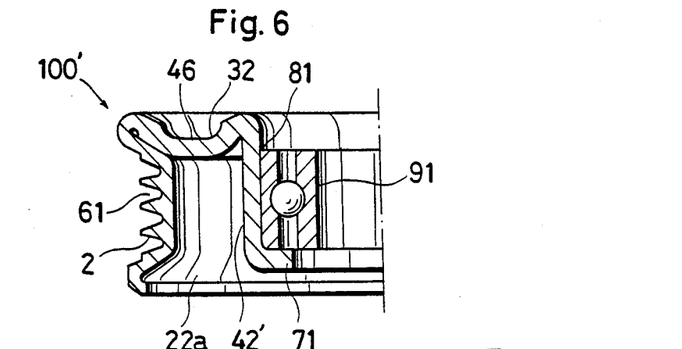
Figure 7:
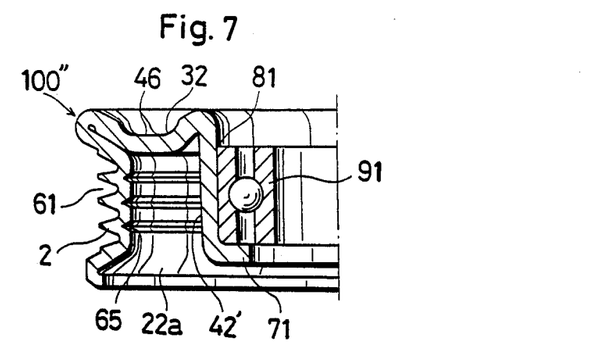

Furthermore, for sheet metal poly-V pulleys manufactured in accordance with the principles of the present invention, a flat sheet metal poly-V pulley 100' not possessing grooves (or concave parts) in the inner side of the peripheral wall, as shown in FIG. 6, is within the scope of the invention. Further, a sheet metal poly-V pulley 100" having V-shaped annular inner grooves 65 smaller than poly-V grooves on the outer surface, wherein the grooves 65 are positioned corresponding to the apex of the partition wall of said poly-V grooves 61, as shown in FIG. 7, is also naturally acceptable.

What is claimed is:

1. A method of manufacturing a sheet metal poly-V pulley comprising the steps of:
   forming a cup-shaped blank by deep-drawing a sheet metal blank and forming a cup-shaped blank having a bottom wall and a rough peripheral wall;
   forming a stepped part by forming an inclined stepped part in said rough peripheral wall and dividing the rough peripheral wall into a poly-V groove forming part at an opening edge side and a preliminary forming part at a bottom side of said rough peripheral wall;

forming a rough preliminary forming blank by reversely drawing said preliminary forming part and bottom side and folding inward, forming an inner peripheral side fold-back projecting part protruding outward between said inclined stepped part and said preliminary forming part, and forming a bearing support part from the preliminary forming part and forming an inverted bottom part from the bottom side;

forming a bent part by further reversely drawing said bearing support part and inverted bottom part inward and forming an outer peripheral side fold-back projected part protruding outward between said poly-V groove forming part and said inclined stepped part, and curving the inclined stepped part of the both inner and outer peripheral side fold-back projected parts inward in a concave form; and forming poly-V grooves in said poly-V groove forming part.

2. A method of manufacturing a sheet metal poly-V pulley as set forth in claim 1, wherein a central side of said inverted bottom part is cut off and removed to form a bearing fitting part, and said bearing support part is held from outside, and a prefabricated bearing is press-fitted and placed into said bearing fitting part.

3. A method of manufacturing a sheet metal poly-V pulley as set forth in claim 1, wherein said poly-V groove forming part is deflected outward to form a deflected part and this deflected part is flattened by pressure to form an increased thickness wall in said poly-V groove forming part.

* * * * *